UNITED STATES PATENT OFFICE.

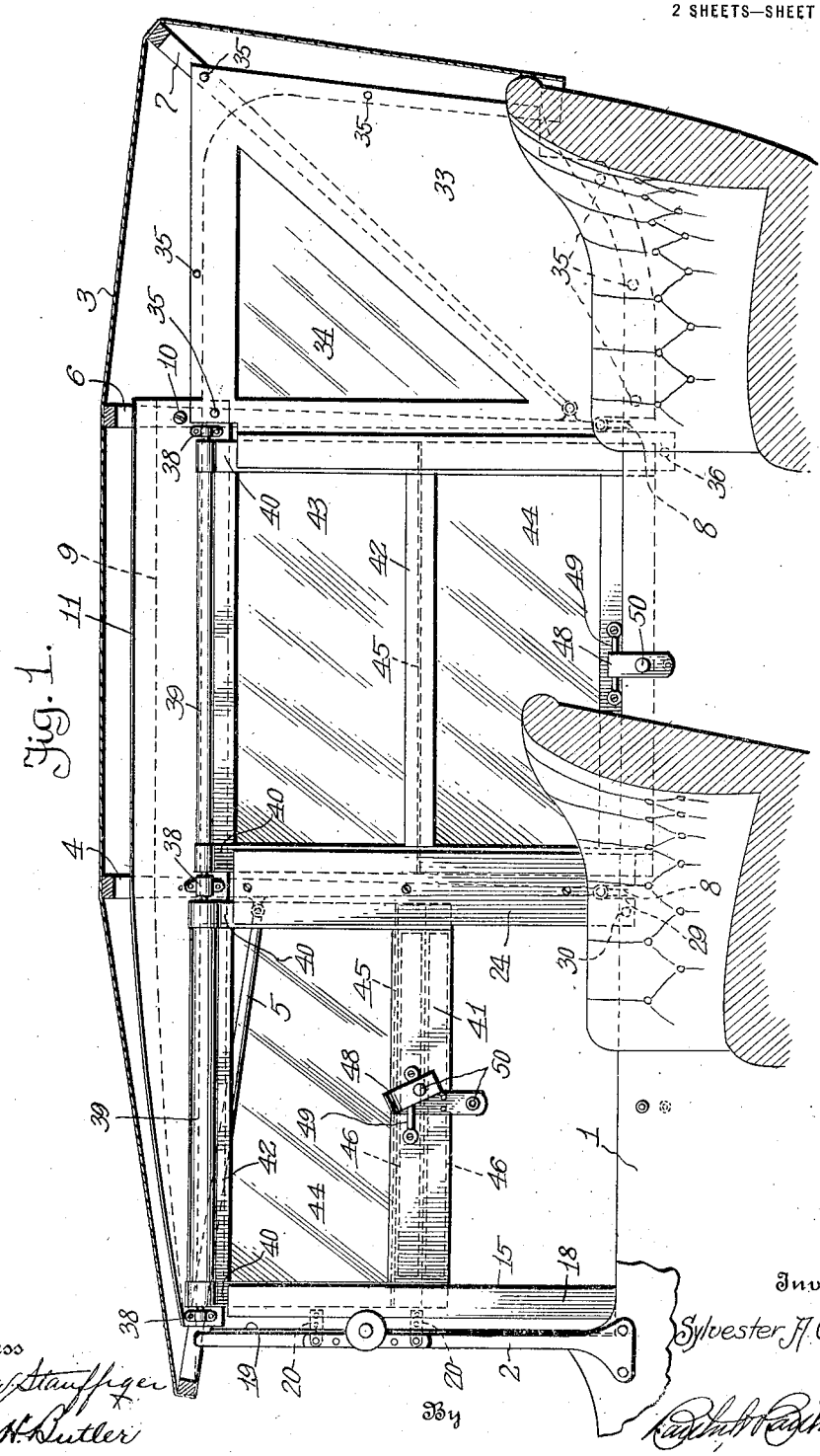

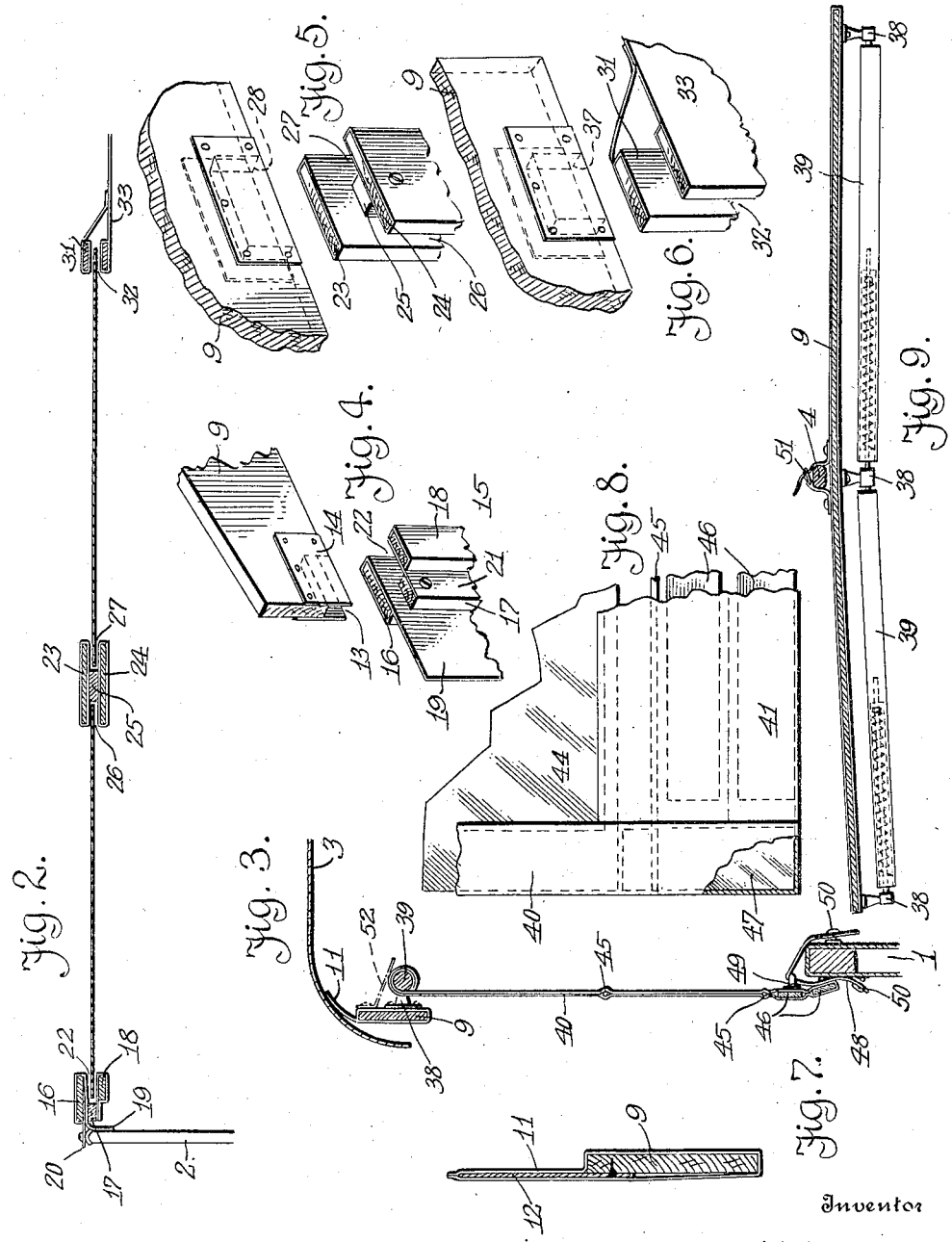

SYLVESTER A. GATES, OF DETROIT, MICHIGAN.

AUTOMOBILE-CURTAIN.

1,353,468.  Specification of Letters Patent.  Patented Sept. 21, 1920.

Application filed December 7, 1918. Serial No. 265,699.

*To all whom it may concern:*

Be it known that I, SYLVESTER A. GATES, a citizen of the United States of America, residing at Detroit, in the county of Wayne and State of Michigan, have invented certain new and useful Improvements in Automobile-Curtains, of which the following is a specification, reference being had therein to the accompanying drawings.

My invention aims to provide an automobile side curtain that may be advantageously used in connection with a collapsible or foldable top to coöperate with the top, when raised or in an active position, in providing an inclosure for the occupants of an automobile, the inclosure having large rollable curtains, somewhat similar to curtain shade rollers, that permit of a desired degree of ventilation and do not obstruct the vision nor impair the general appearance of the automobile or the top.

My invention further aims to provide automobile side curtains that may be installed to provide a winter top, and the side curtains are constructed so that the same may be easily and quickly installed without necessarily changing any part of an automobile body or the collapsible top carried thereby. In constructing the side curtains provision has been made to positively exclude air drafts when the curtains are closed and also to insure an easy operation of the curtains without any danger of the curtains buckling or being injured.

My invention further aims to provide side curtains that are applicable to various types of automobiles and these curtains will be hereinafter specifically described and then claimed.

Reference will now be had to the drawings, wherein—

Figure 1 is a longitudinal sectional view of a portion of an automobile having a top provided with side curtains in accordance with my invention, one of the curtain shades being shown as closed, and another as partially raised;

Fig. 2 is a horizontal sectional view of one of the side curtains;

Fig. 3 is a vertical cross sectional view of the same;

Fig. 4 shows perspective views of a joint adapted to be established between a front rail and a top rail;

Fig. 5 shows similar views of a joint adapted to be established between the top rail and an intermediate rail;

Fig. 6 shows similar views of the joint adapted to be established between the top rail and a rear rail;

Fig. 7 is an enlarged cross sectional view of the top rail;

Fig. 8 is a side elevation of a portion of a curtain shade, partly broken away and partly in section, and Fig. 9 is a horizontal sectional view of the top rail.

In describing my invention by aid of the views above referred to I desire to point out that the same are intended as merely illustrative of the automobile side curtains as now in use, and I do not care to confine my invention to the precise construction and arrangement of parts shown, other than that defined by the appended claims.

In the drawings, the reference numeral 1 denotes an automobile body having a windshield 2 and a collapsible or foldable top 3, said top including a front bow 4, an outrigger bow 5, a rear bow 6 and an inclined bow 7, all of these bows coöperating in supporting the usual cover or canopy with said front and rear bows supported by side irons so that the top may be collapsed or set up.

To convert the automobile body 1, provided with the windshield 2 and top 3 from an open to a closed car, I provide side curtains and as the same are identical in design and construction, I deem it only necessary to describe one of the curtains, it being understood that two are used.

The equipment for each side of the automobile comprises a top rail 9 preferably in the form of a flexible thin strip of wood covered with imitation leather or other durable material, such as oilcloth, canvas or a material that will conform and harmonize with the finish of the top 3 of the automobile 1. This top rail extends from the rear bow 6 to a point in proximity to the windshield 2 and said top rail may be connected to the inner side of the rear bow 6 by a screw 10 or other fastening means. The material forming the exposed surface of the top rail 9 is carried beyond the upper edge of the strip forming said rail in order to provide a longitudinal flap 11 to which a degree of rigidity is added by a strip of material 12 within the flap, and as clearly shown in Fig. 3 this flap is adapted to engage the inner wall of the top 3 and close the space between the top 3 and the upper edge of the top rail 9, thereby excluding air that would otherwise enter the upper portion of the top.

The front end of the top rail 9 is cut away and provided with side plates 14 cooperating with the cut away portion of the top rail in forming a socket 13. This socket is adapted to receive a portion of the upper end of a vertically disposed front rail or stanchion, generally designated 15. By reference to Figs. 2 and 4, it will be noted that this front rail is composed of three members 16, 17 and 18, the member 16 being adapted to extend into the socket 13 of the top rail 9. The members 17 and 18 are also covered with material, similar to the top rail, and the material surrounding the member 16 terminates in a flap 19 that abuts against the windshield 2 and may be connected thereto by clips 20 or similar fastening means, said flap preventing air to any great extent passing between the windshield 2 and the side curtains of the automobile top.

The member 18 is supported from the member 17 by a plate 21 and this plate, as well as the member 17, may be suitably connected to the member 16, so that the members 16 and 18 will coöperate in providing a groove or guide way 22 in the front rail.

The intermediate rail is formed by members 23, 24 and 25, the member 25 being interposed between the members 23 and 24 to serve as a spacer therefor and provide grooves or guideways 26 and 27 at the side edges of the intermediate rail. The members 23 and 24 are covered with a material similar to the top and front rails and the members 24 and 25 are of a less length than the member 23, in order that the upper end of said member may extend into a socket 28 provided therefor in the lower edge of the top rail 9, the socket being formed by side plates and a cut away portion, similar to the socket 13.

The member 24 of the intermediate rail has its lower ends slotted, as at 29, so as to fit over the front iron 8, and the lower end of said intermediate rail may be connected to the side of the automobile body 1 by a screw 30 or other fastening means.

A rear rail 31 is formed somewhat similar to the front rail so as to provide a groove or guideway 32, said rear rail having its members covered with material which may be a part of a rear side curtain 33 suitably connected, at places indicated 35, to the inclined bow 7, the top 3, the top rail 9 and the automobile body 1. The rear side curtain 33 has a suitable window or transparent panel 34 and said side curtain, together with fastening means 36 at the lower end of the rear rail coöperate with the automobile body in supporting the rear rail. The upper end of the rear rail extends into a socket 37 in the top rail 9, said socket being formed similar to the other socket in said top rail.

The inner side of the top rail 9 is provided with brackets 38 for supporting the pintles of spring curtain shade rollers 39 on which are placed rollable curtains that have the side edges thereof sliding in the grooves or guideways 22, 26 27 and 32 of the front, intermediate and rear rails. Each curtain is composed of side binder strips 40, a lower binder strip 41, an intermediate binder strip 42, transparent panels 43 and 44, transverse reinforcement rods 45 and members 46 and 47 in the binder strips 41 and 40 respectively to add a degree of rigidity thereto, particularly at the lower end of each curtain. With the celluloid or transparent material forming the panels 43 and 44 extending into the side binding strips 40, the curtains or shades can readily slide in the guideways or grooves provided therefor in the front, intermediate and rear rails, without any danger of the curtains or shades buckling or becoming accidentally displaced.

The lower ends of the curtains or shades have the inner sides thereof provided with straps 48 extending through handles 49 of the curtains or shades, said straps being riveted or otherwise fixed to the curtain and the ends thereof provided with snap buttons 50 so that the straps may be connected to the inner or outer walls of the automobile body or its doors.

As clearly shown in Fig. 7, the inner end of the strap can be fastened to the inner side wall of the automobile body or a door carried thereby, so that the lower edge of the curtain or shade is drawn inwardly against the outer wall of the automobile body or a door thereof, thus preventing air from passing upwardly at the edge of the curtain or shade into the automobile body. With the outer strap adapted to be secured to the outer wall of the automobile body, it is possible for the occupant of the automobile, after leaving the same, to close the curtain or shade and secure it in such position.

As some automobile bodies and the tops thereof have stream lines or curved sides, the top rail 9 has been provided with a strap and buckle, designated 51, so that the top rail may be slightly bent or flexed and connected to the front bow 4, thus causing the top rail to conform in outline to the side of the top.

In some instances, it may be desired to use a flap 52 above the curtain rollers 39 to prevent air from passing between the top rail and the curtain rollers, particularly when the curtains are lowered. Such a flap has been shown in Fig. 3 as supported by the top rail.

From the foregoing it will be observed that the vertical rails provide stanchions or upright members that lend solidity to the general appearance of the inclosure, and as said stanchions or upright members are rigid, it is possible to easily slide the curtains or shades therebetween. With these curtain shades of large area visibility is not obstructed, and the top as an entirety has an appearance as though being permanent relative to the automobile body. Considerable importance is attached to the construction of the curtains or shades *per se*, as said curtains or shades are constructed to withstand considerable wind pressure and rough handling without being buckled, cracked or otherwise injured. In some instances it may be desirable to place certain of the window shade rollers on the outer wall of the top rail, but so long as said curtain shade rollers are within the side walls of the top 3, practically the same result is attained as to appearance.

What I claim is:—

1. The combination of top rails adapted to be detachably carried by the top of an automobile and extending approximately from the windshield to the rear bow of said top; front, intermediate and rear rails or uprights adapted to be connected to said top rail and provided with guideways, curtain rollers carried by said top rails, curtains on said rollers and slidable in said guideways and means for holding said curtains when lowered.

2. The combination set forth in claim 1, and wherein the front rails are provided with flaps adapted to engage with a windshield, and the rear rails are provided with side curtains.

3. The combination of top rails having sockets, front, intermediate and rear rails having the upper ends thereof mounted in the sockets of said top rails and providing guideways, curtain rollers carried by the inner side walls of said top rails, curtains on said rollers and having the side edges thereof slidable in the guideways of said front and intermediate and rear rails, straps carried by the lower ends of said curtains and adapted for attachment to the inner and outer walls of an automobile body, flaps carried by said front rails and adapted for engagement with a windshield, flaps carried by said top rails and adapted to engage an automobile top, and side curtains connected to said rear rails and adapted for attachment to the automobile body.

4. In an automobile top the combination with top rails substantially co-extensive therewith of front, intermediate and rear rails or uprights detachably connected to said top rails provided with guideways, flexible roller curtains supported on said top rails and adapted to have the side edges travel in said guideways, each curtain consisting of side and bottom binder strips, transparent panels having portions extending into the side binder strips, a reinforcing rod intermediate said panels and stiffening members in said side and bottom binding strips coöperating with the side edges of said panels in adding rigidity to the marginal edges of said curtains.

5. In a top inclosure for an automobile body, guides having the lower ends thereof terminating at or near the top of the outer wall of the automobile body, a curtain having side binder strips in the lower marginal portion of the curtain slidable in said guides, flexible transverse members with the ends thereof adjacent the side binder strips adapted to travel in said guides, and means on the inner side of the curtain adapted to be attached to the inner wall of the automobile body to spring the middle portion of the curtain member against the outer wall of the automobile body.

6. An inclosure for an automobile body comprising a top having curtains, flexible top rails secured to said top and supporting said curtains, means intermediate the ends of said top rails and adapted for attachment to an automobile top to maintain said top rails flexed in conformity to the contour of the automobile top, and flaps carried by the rails to seal the space between the rails and top.

In testimony whereof I affix my signature in the presence of two witnesses.

SYLVESTER A. GATES.

Witnesses:
ANNA M. DORR,
KARL H. BUTLER.